United States Patent
Park

[11] Patent Number: 6,006,315
[45] Date of Patent: Dec. 21, 1999

[54] COMPUTER METHODS FOR WRITING A SCALAR VALUE TO A VECTOR

[75] Inventor: Heonchul Park, Cupertino, Calif.

[73] Assignee: Samsung Electronics Co., Ltd., Seoul, Rep. of Korea

[21] Appl. No.: 08/733,906

[22] Filed: Oct. 18, 1996

[51] Int. Cl.[6] .................................................. G06F 15/16
[52] U.S. Cl. ........................................ 712/7; 712/2; 712/4
[58] Field of Search ........................ 395/800.07, 800.02, 395/800.03, 800.04, 800.05, 800.06, 800.08, 800.09

[56] References Cited

U.S. PATENT DOCUMENTS

| | | | |
|---|---|---|---|
| 3,827,031 | 7/1974 | Kastner et al. | 340/172.5 |
| 4,933,839 | 6/1990 | Kinoshita et al. | 364/200 |
| 5,226,135 | 7/1993 | Mishina et al. | 395/425 |
| 5,331,554 | 7/1994 | Graham | 364/419.07 |
| 5,461,586 | 10/1995 | Nasu | 365/200 |
| 5,511,210 | 4/1996 | Nishikawa et al. | 395/800 |

*Primary Examiner*—Meng-Ai T. An
*Assistant Examiner*—Walter D. Davis, Jr.
*Attorney, Agent, or Firm*—Skjerven, Morrill, MacPherson, Franklin and Friel; Michael Shenker; Fabio E. Marino

[57] ABSTRACT

A method is provided for writing a scalar value to a vector V1 without reading the vector from a storage device. A scalar value to be written into the vector at a specified position and a scalar value (index) representing such position are read from a storage device into an Arithmetic Logic Unit (ALU) of a vector processor. The ALU then generates another vector V2 having multiple copies of the scalar value to be written into V1. ALU also generates a mask representing the index. The vector V2 is then delivered to the storage storing V1, but the mask is applied so that only one or more, but not all, copies of the scalar value are written from V2 to the storage. The rest of the vector V1 remains unchanged. The invention reduces register file read contention. Furthermore, if the updated V1 (i.e. V1 having the scalar value) is to be used in the next instruction, a copy of V1 is read from the storage and is updated from V2 and the mask, simultaneously with V1 being updated in the storage. Thus, the updated V1 need not be read from the storage.

6 Claims, 10 Drawing Sheets

COMPUTER METHODS FOR WRITING A SCALAR VALUE TO A VECTOR

CROSS-REFERENCE TO RELATED APPLICATIONS

This application is related to U.S. patent application Ser. No. 08/733,907, (now U.S. Pat. No. 5,832,288) entitled "Element Select Mechanism for a Vector Processor" by Roney S. Wong, U.S. Pat. No. 5,832,288, issued on Nov. 3, 1998.

BACKGROUND OF THE INVENTION

1. Field of the invention

The present invention relates generally to computer methods for vector processing and specifically to methods for writing a scalar value to a vector stored in a computer system.

2. Description of Related Art

Several applications such as 3-D graphics, medical imaging and scientific modelling require modern computers to be able to operate on vectors.

In some computer systems, the process of substituting a single element of a vector is carried out by first reading a vector from storage, modifying the vector and then writing the entire vector back to the storage. FIG. 1 shows a typical prior art microprocessor 100 having an ALU 110 whose output is connected to a register bank 130 via an on-chip bus 120. The register bank 130 is, in turn, connected to the inputs of ALU 110 via buses 140 and 150.

To replace an element of a vector 160 stored in register 170, the contents of register 170 are first read onto bus 140 to be fed to input 180 of ALU 110. Similarly, scalar element 165 stored in register 175 is read onto bus 150 to be fed to input 190 of ALU 110. A second scalar value 167, stored in register 172 and representing the position at which scalar element 165 is to be inserted into vector 160, must also be read from register bank 130 onto ALU 110. ALU 110 then copies scalar element 165 into a specified position of vector 160 and the modified vector is written out to on-chip bus 120 to be written back to register 170.

As vector processing becomes more and more common in modern computers for such applications as 3D-graphics, medical imaging and scientific modelling, it becomes increasingly desirable to replace vector elements fast.

In FIG. 1, three operands are read from the register bank 130 to the ALU 110. Register bank 130 has only two output ports and, therefore, two clock cycles are required to read all three operands from the register bank 130, in addition to a third cycle to replace the element in the vector in the ALU 110 and a fourth cycle to write the vector back into the register 170.

SUMMARY

The present invention provides a method for writing a scalar value to a vector without reading the vector from storage. A scalar value is any value whose width is less than the width of a vector. In some embodiments a scalar value is one or more vector elements. In some embodiments, to write a scalar value to a first vector stored in a storage, a second vector is generated that includes multiple copies of the scalar value. The second vector is supplied to an input of the storage, but a mask signal is used to write only one copy of the scalar value from the second vector to the first vector, while the rest of the first vector remains unchanged. Since the vector is not read from the storage for the operation of writing a scalar value to the vector, contention for register file access is reduced.

In some embodiments a first instruction to write a scalar value to a first vector is followed by a second instruction using the first vector. The second instruction uses the new value of the first vector, i.e. the value updated by the scalar value. However, to execute the second instruction sooner, the old value of the first vector is read out of the storage for use in the second instruction before the scalar value is written from the second vector to the storage. When the second vector is supplied to an input port of the storage to write the scalar value to the first vector, the second vector is also supplied to a circuit that received the old value of the first vector when the first vector was read from storage. That circuit also receives the mask signal. Using the second vector and the mask, the circuit writes the scalar value from the second vector to the first vector read from storage, thus updating the first vector for use in the second instruction. Because the second instruction does not need read the updated value of the first vector from storage, the second instruction can be executed sooner.

BRIEF DESCRIPTION OF THE DRAWINGS

FIGS. 8A–D show examples of vectors generated by the ALU-3 of FIG. 3 for specific scalar values and data sizes.

DESCRIPTION OF PREFERRED EMBODIMENTS

Figure 1:
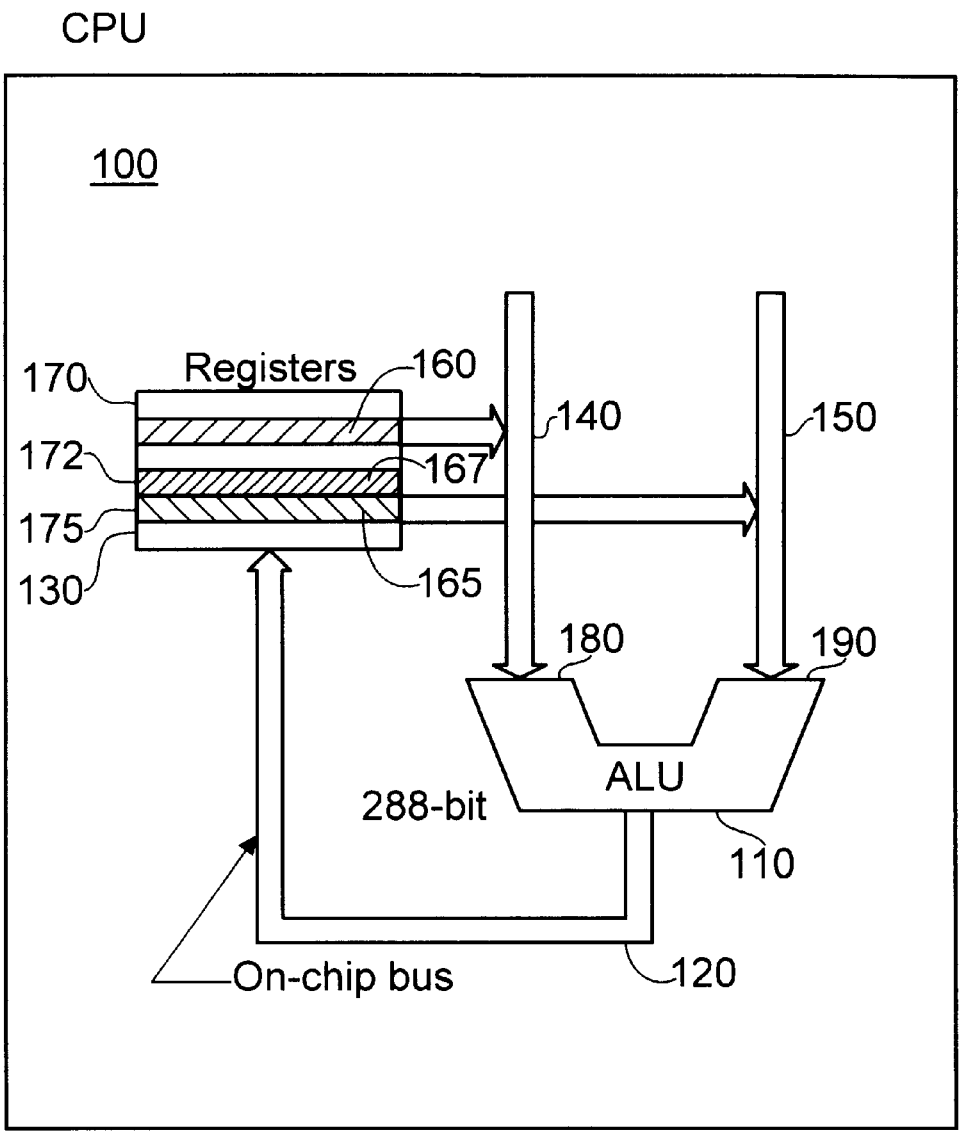
FIG. 1 is a block diagram of a prior art microprocessor.
Figure 2:
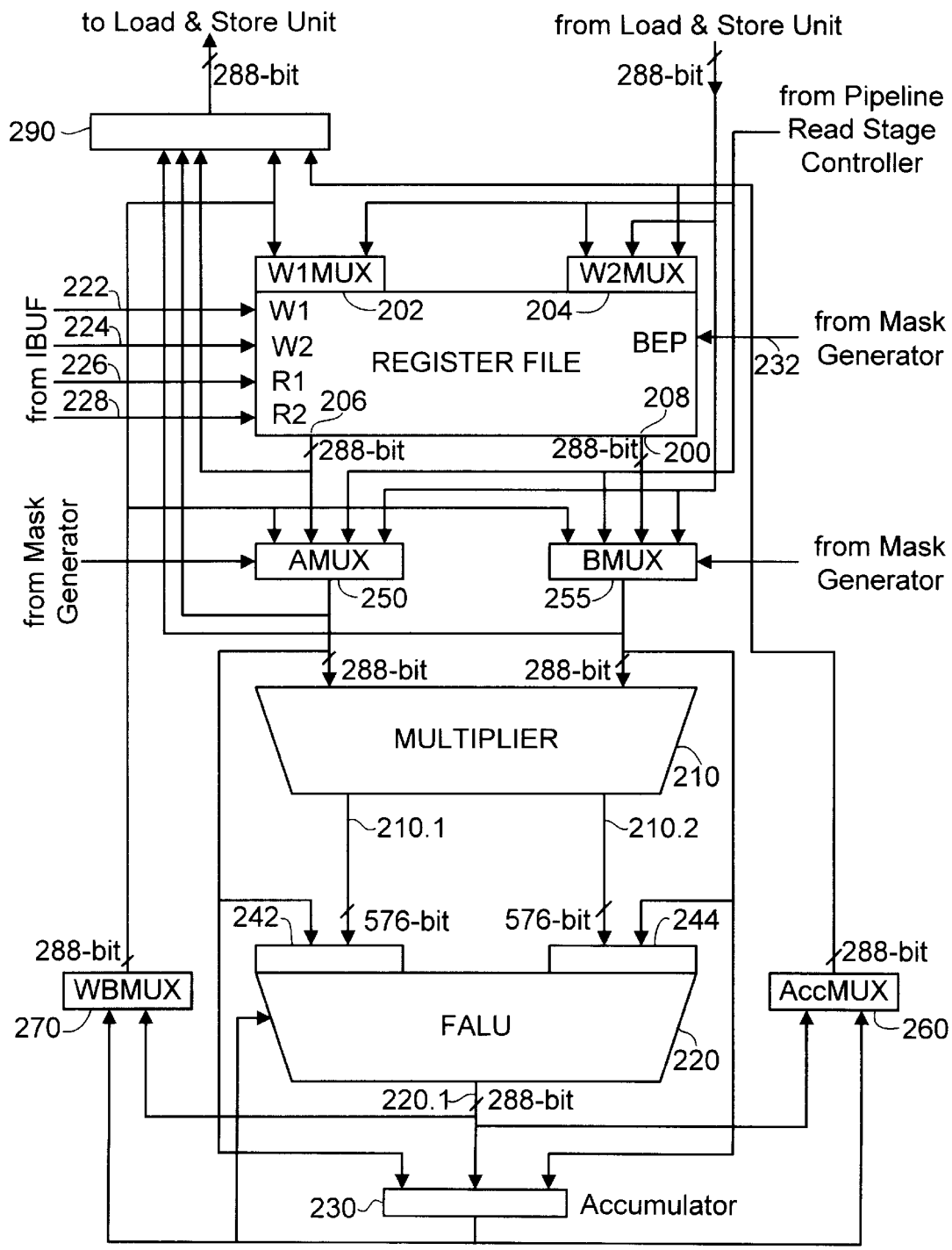
FIG. 2 is a block diagram of a vector processor, including a register file 200 and an ALU 220, that can write a scalar value to a vector according to the present invention.

FIG. 2 illustrates a portion of a vector processor that can write a scalar value to a vector according to the present invention. The vector processor includes a register file 200, a multiplier 210, an ALU 220 and an accumulator 230. The register file 200 contains thirty-two 32-bit scalar registers and sixty-four 288-bit vector registers. Each of these registers (not shown in the drawing) can be written via 288-bit input port 202 or 204 and read via 288-bit output port 206 or 208. Registers within the register file 200 are selected for input and output via write address controls 222 and 224 and read address controls 226 and 228. Controls 222, 224, 226, 228 receive signals from the instruction buffer IBUF (not shown). Write address control 222 selects which register is written from input port 202. Write address control 224 selects which register is written from input port 204. Read address control 226 selects which register is read to output port 206. Read address control 228 selects which register is read to output port 208. In addition, 32-bit byte enable port 232 is used to apply a mask to the data received by input ports 202 or 204 so that only selected bits of the data received by input port 202 or 204 are written to the register selected by respective write address controls 222 or 224. The mask is applied to input ports 202 and 204 on alternate clock cycles. In a different embodiment, the mask is applied to input ports 202 and 204 on alternate clock half-cycles. Byte enable port 232 is connected to the output 220.2 of mask generator 330 (FIG. 3) via a multiplexer (not shown) used to control which one of several byte enable sources is to be connected to byte enable port 232. These byte enable sources include, in addition to output 220.2, a vector global mask register (not shown), a vector memory mask register (not shown) and a pipeline control logic (not shown). However, for purposes of the present invention, byte enable port 232 is connected through the multiplexer either to output 220.2 of mask generator 330 or to a special register containing a blank (all zeroes) mask (used in VEC64 mode).

Output ports 206 and 208 are connected to inputs of respective multiplexer circuits AMUX 250 and BMUX 255 and to an input of MUX 290 whose output is connected to a load and store unit (not shown). In addition to the multiplexing function, AMUX 250 and BMUX 255 can write a scalar value to a vector read from ports 206 or 208, as described below. In addition, each of AMUX 250 and BMUX 255 has the following inputs: a 288-bit input connected to a 288-bit line from a load and store unit (not shown) of the vector processor (this line is connected to both AMUX 250 and BMUX 255), a 32-bit input connected to a pipeline read stage controller (not shown) to allow an immediate value operand to be supplied from the pipeline read stage controller to the ALU 220, a 288-bit input connected to the output of WBMUX 270, and a 32-bit input connected to output 220.2 of mask generator 330 (FIG. 3), which is part of ALU 220. The pipeline read stage controller provides appropriate signals after the instruction decoder (not shown) decodes appropriate signals in the instruction buffer (IBUF; not shown).

The 288-bit outputs of AMUX 250 and BMUX 255 are connected to respective inputs of multiplier 210, MUX 290, and accumulator 230. The output of AMUX 250 is also connected to an input of MUX 242 whose other, 576-bit input is connected to output 210.1 of multiplier 210. The output of MUX 242 is connected to one input of ALU 220. The output of BMUX 255 is connected to one input of MUX 244 whose output is MUX 244 has a 576-bit input connected to output 210.2 of multiplier 210, connected to a different input of ALU 220.

Multiplexers 242 and 244 allow ALU 220 to receive data either from AMUX 250, BMUX 255 or from multiplier 210. The 288-bit output of ALU 220 is, in turn, connected to inputs of multiplexers AccMUX 260, WBMUX 270 and accumulator 230. The output of accumulator 230 is connected to other inputs of AccMUX 260 and WBMUX 270. Thus, the results of an operation performed in the ALU 220 can be stored in the accumulator 230 and/or routed back to AMUX 250 and BMUX 255 for subsequent processing and for writing back to register file 200 through WBMUX 270 and AccMUX 260. The output of WBMUX 270 is connected to inputs of W1MUX 240 and MUX 290, while the output of AccMUX 260 is connected to inputs of W2MUX 245 and MUX 290.

Figure 3:
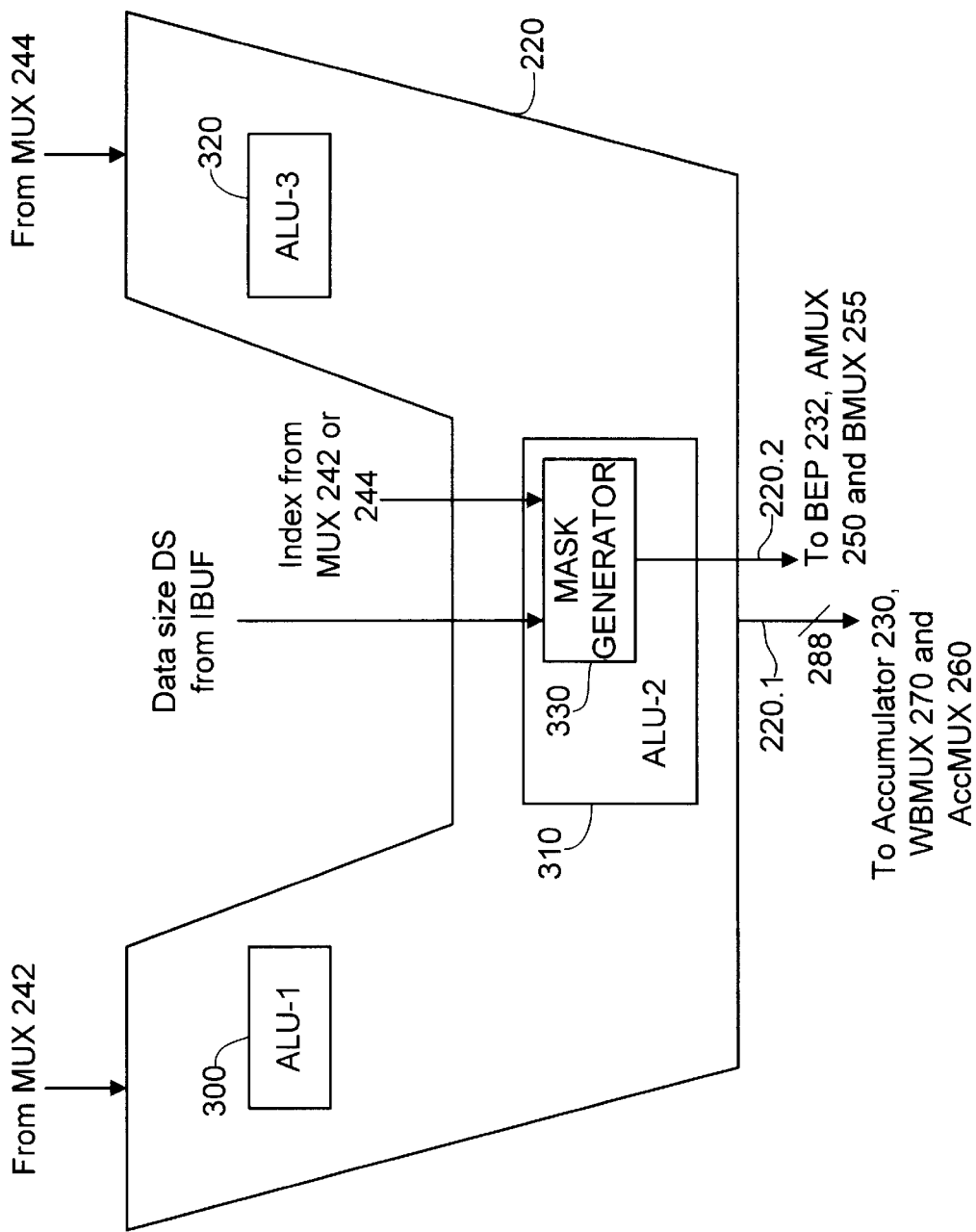
FIG. 3 shows further detail of the ALU 200 of FIG. 2.

FIG. 3 illustrates ALU 220 in greater detail. ALU 220 is subdivided in ALU-1 300, ALU-2 310 and ALU-3 320, each responsible for a subset of the logic and arithmetic operations performed by ALU 220. In particular, ALU-2 310 contains Mask Generator 330, which is responsible for generating a 32-bit wide mask used to control which elements of a vector are to be written to register file during a vector write operation. A suitable mask generator for purposes of the present invention is described in U.S. Pat. No. 5,833,288, entitled "Element Select Mechanism for a Vector Processor" by Roney S. Wong, filed on the same date as the present application and having attorney docket no. M-4443, which is herein incorporated by reference in its entirety.

The processor of FIG. 2 recognizes the data types described in Table 1. In addition, the processor recognizes the IEEE Standard 754 single format for floating point data type.

TABLE 1

| Boolean  | 1 bit wide   |
|----------|--------------|
| Byte     | 8 bits wide  |
| Byte9    | 9 bits wide  |
| Halfword | 16 bits wide |
| Word     | 32 bits wide |

Figure 4:
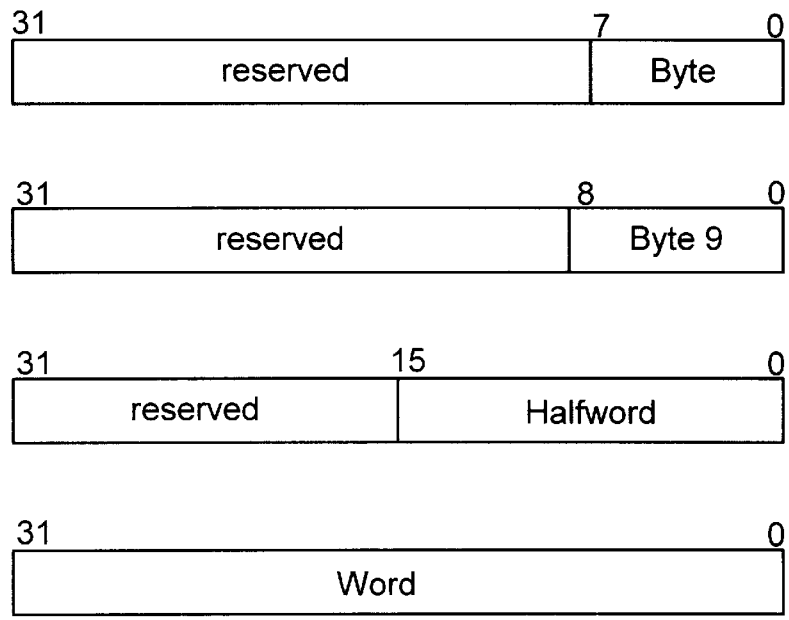
FIG. 4 illustrates data type formats used in scalar registers.

Each of the 32 scalar registers SR0–SR31 in register file 200 is 32 bits wide. FIG. 4 shows the data type formats for the scalar registers. The reserved bits in FIG. 4 have no defined value.

In some embodiments, each scalar register is 36 bits wide. If the data type is halfword, the halfword is placed in bits [0:7] and [9:16]; the remaining bits are reserved. If the data type is word, the word is in bits [0:7], [9:16], [18:25], [27:34]; the remaining bits are reserved.

The 64 vector registers in register file 200 are organized into two banks, each with 32 registers. Bank0 contains the first 32 registers and bank1 contains the second 32 registers. One of the two banks is set as the "current" bank and the other bank is the "alternate" bank. Vector instructions use the registers in the current bank by default. The load/store and register move instructions can access registers in the alternate bank. A bit in the Vector Control and Status Register (VCSR) indicates whether bank0 or bank1 is the current bank. The vector registers in the current bank are referenced as VR0 through VR31 and the registers in the alternate bank are referenced as VRA0 through VRA31.

In an alternative mode, the banks are merged to provide thirty-two 576-bit vector registers. This mode is referred to as the 64 byte9 vector mode or the VEC64 mode. The other, non-VEC64, mode is referred to as the VEC32 mode. A bit in the VCSR specifies the mode of operation. In VEC64 mode, the 576-bit registers are referenced as VR0 through VR31.

Figure 5:
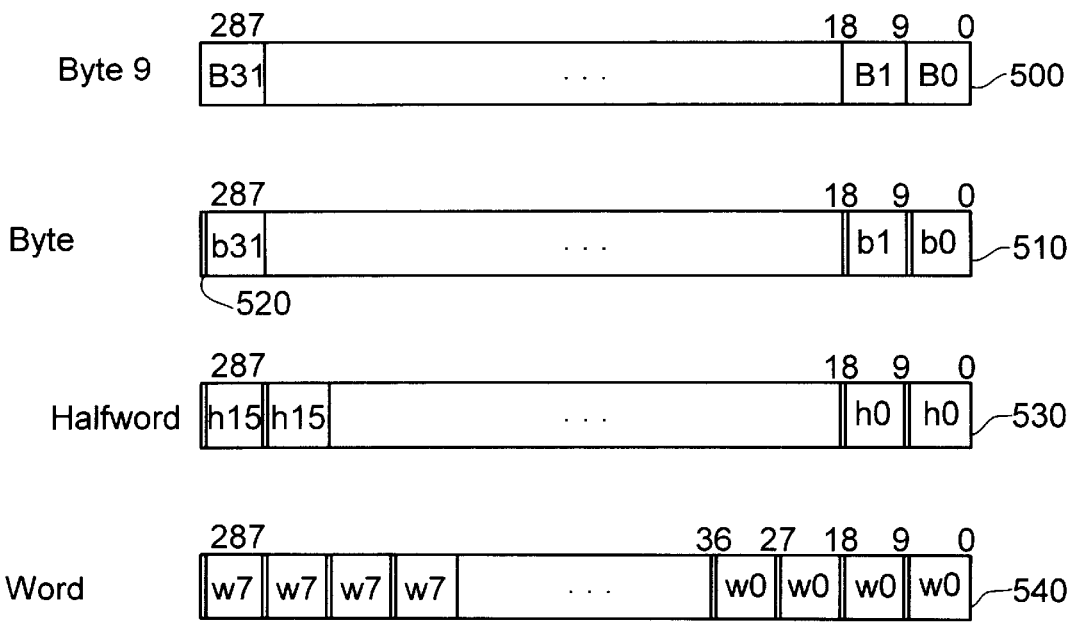
FIG. 5 shows data types in a vector register.

FIG. 5 illustrates data type formats used in vector registers. Each 288-bit vector is divided into eight 36-bit fields. Each 36-bit field can be treated as either four 9-bit bytes (shown at 500), four 8-bit bytes (shown at 510), two 16-bit halfwords (shown at 530) or a single 32-bit word (shown at 540). When the data type is 8-bit bytes 510, 16-bit halfwords 530, or 32-bit words 540 every ninth bit (such as bit 520) is treated by the processor as a reserved bit, i.e. the bit is ignored.

Figure 6:
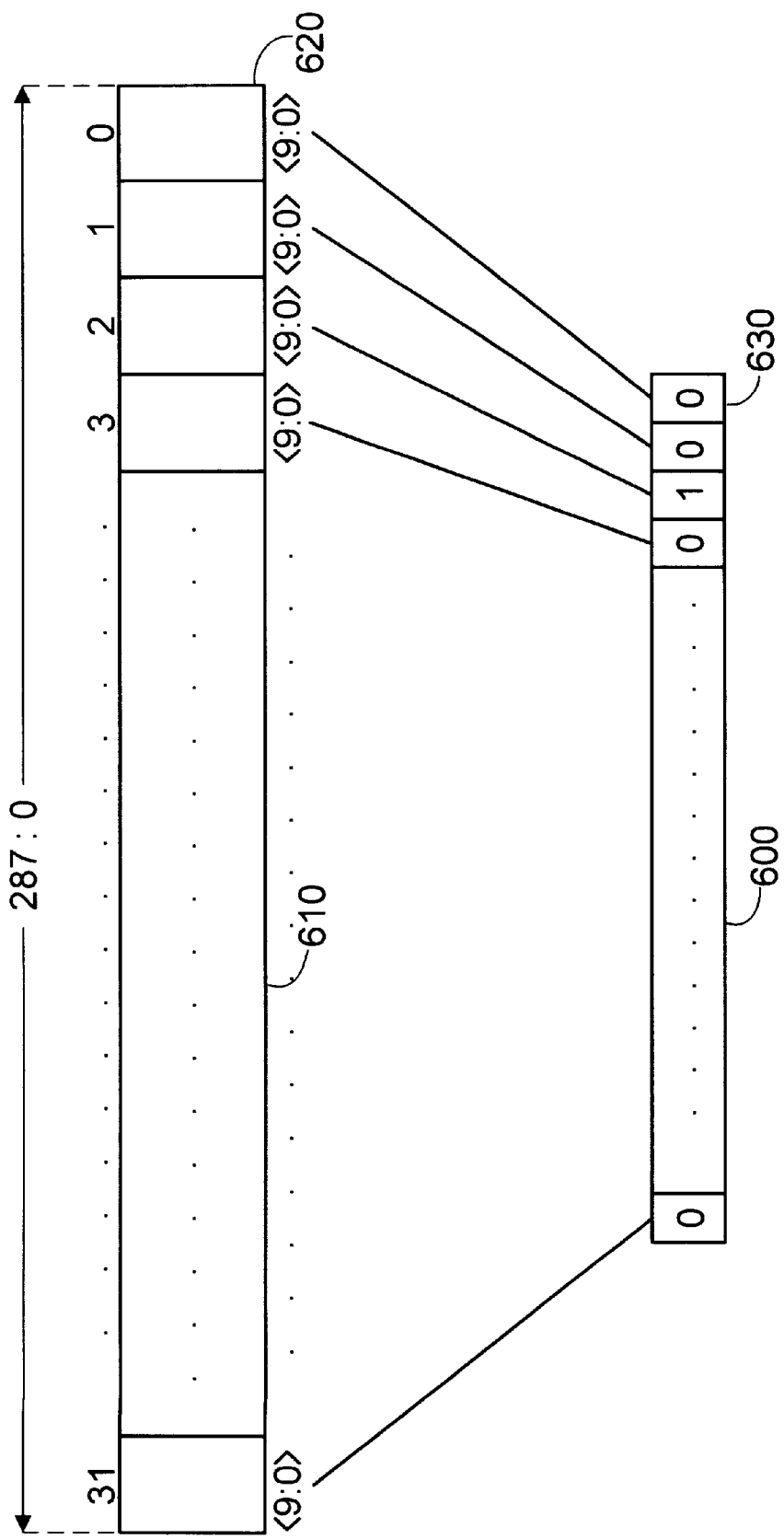
FIG. 6 illustrates how each bit in the 32-bit mask generated by mask generator 330, shown in FIG. 3, maps into a vector depending on the data type used.

FIG. 6 illustrates how each bit in the 32-bit mask 600 generated by mask generator 330 (FIG. 3) maps into a 288-bit vector 610. When the vector is written to register file 200, each bit 630 in mask 600 corresponds to a 9-bit byte 620 in the vector. Each bit in the mask determines whether the corresponding byte9 in vector 610 is written. In FIG. 6, only bit 2 of mask 600 is set, therefore, only byte9 number 2, i.e. only bits 18–26 of vector 610, are written.

A scalar value is written to a vector register in register file 200 when the processor executes an instruction VINSRT shown in FIG. 9 and described in more detail below. In FIG.

9 5-bit field VRd (field 970) identifies the vector register in file 200. In VEC32 mode, VRd is one of 288-bit registers VR0–VR31 in the current bank, while in VEC64 mode VRd is one of 576-bit registers VR0–VR31. A 2-bit field DS specifies the data type of the scalar value (byte8, byte9, halfword, or word) to be written. A 5-bit field SRa specifies the scalar register containing the scalar value, and a 5-bit field SRb/IM5 (field 980) provides the index which specifies to which position in the vector register the scalar value is to be written. Depending on bits D, S, and M, this field contains either an immediate value obtained by combining SRb/IM5 with IM9 (field 960), or the address of the scalar register SRb containing the index. Bits D, S and M specify whether SRb/IM5 is an immediate value or a value in a scalar register. The 5 LSBs of the index are used to specify a number between 0 and 31.

Figure 7A:
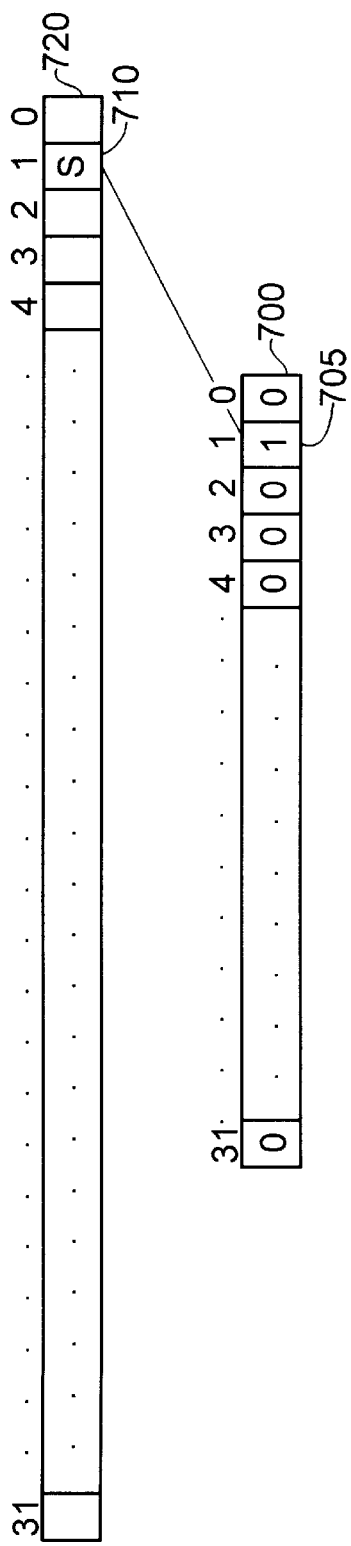
FIGS. 7A–C show masks generated for some element positions in a vector and some data types.
Figure 7B:
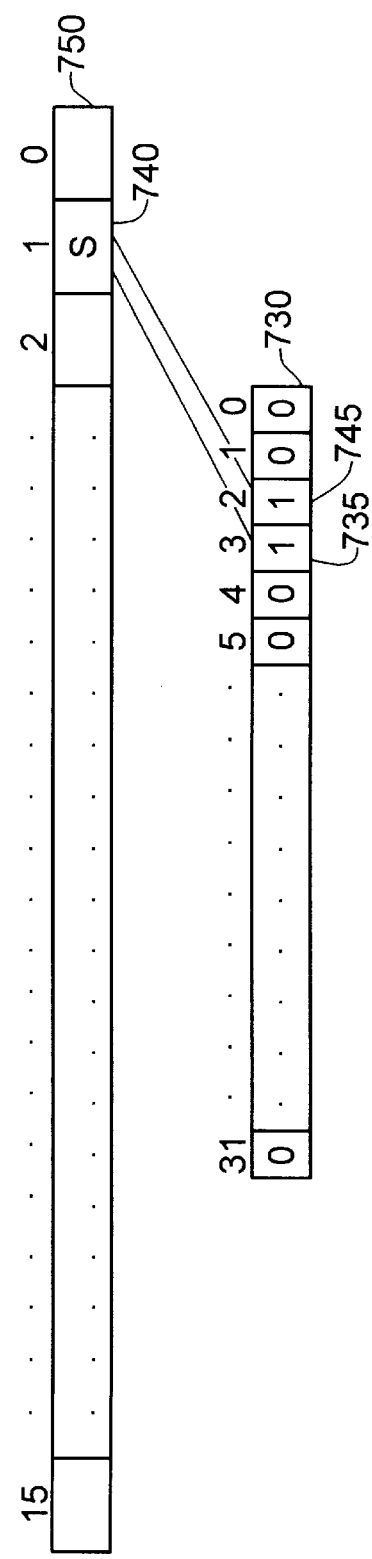
Figure 7C:
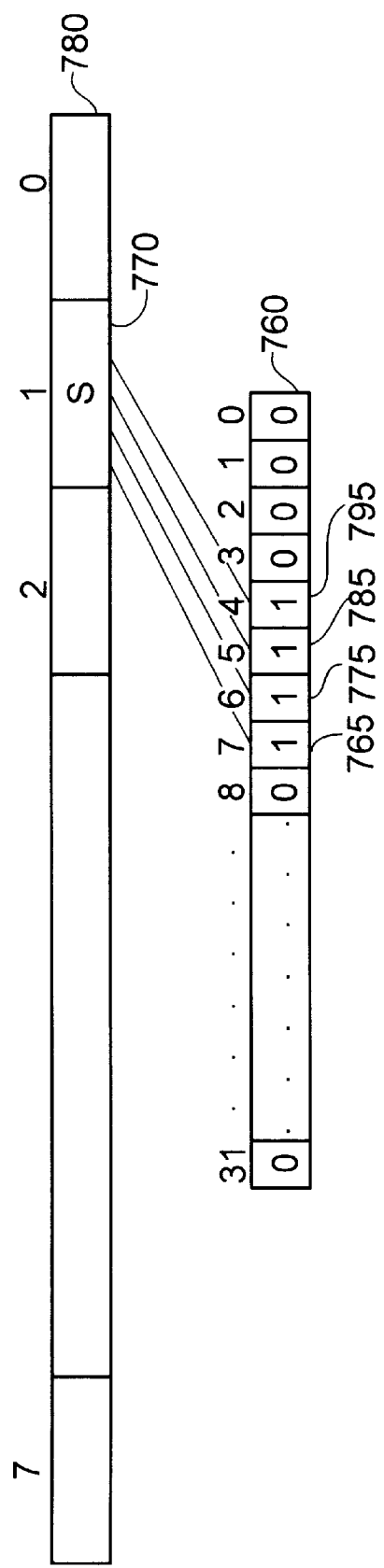

When VINSRT is executed, the field DS is supplied to a first input of mask generator 330. The index is supplied to a second input of mask generator 330. The index is either the immediate value or is read from register SRa. Mask generator 330 generates a 32-bit mask as illustrated in FIGS. 6, 7A–7C. If DS specifies the byte9 data type, then in the 32-bit mask the bit whose number is given by the index is set (i.e. it becomes a logical one), and the remaining bits are reset (i.e. they become logical zeroes). In FIG. 6, the index is 2 and the 32-bit mask has zeroes in all locations except bit 2. If DS specifies the byte (8-bit) data type, the operation of the mask generator is the same as for the byte9 data type. See FIG. 7A in which the index value is 1. If DS specifies the halfword data type (FIG. 7B), the index is a number from 0 to 15 inclusive. In FIG. 7B, the index is 1. Mask generator 330 sets the mask bits at positions corresponding to the halfword number "index", i.e. at positions index*2 and index*2+1 (bits 2 and 3 in mask 730 in FIG. 7B). The remaining mask bits are reset. If DS specifies the word data type (FIG. 7C), the index is a number from 0 to 7 inclusive. In FIG. 7C, the index is 1. Mask generator 330 sets mask bits for the word number "index", i.e. bits index*4, index*4+1, index*4+2 and index*4+3 (bits 4–7 in mask 760 in FIG. 7C). The remaining bits are reset.

Figure 9:
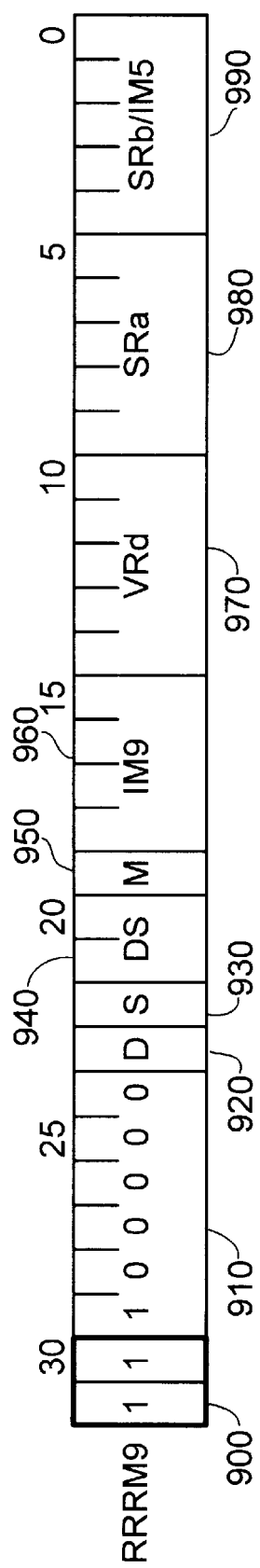
FIG. 9 illustrates the format of a VINSRT instruction, executed by the processor of FIG. 2 to rewrite a scalar value to a vector in accordance with the present invention.

A VINSRT instruction, shown in FIG. 9, is read from a memory into an pipeline read stage controller of the vector processor and is executed as follows. Note, however, that if VEC64 is used the pipeline read stage controller generates two VINSRT instructions, one with a vector register in bank0 as a destination register and one with a vector register on bank1 as a destination register. In addition, the controller generates a first instruction flag identifying the first instruction to be executed.

Clock cycle 1 During cycle 1, SRa field 980 is delivered to one of read address controls 226 or 228 to read the SRa register to a respective one of AMUX 250 or BMUX 255. If SRb/IM5 field 990 (the index field) specifies a register, field 990 is delivered to the other one of read address controls 226 or 228 to read SRb to the other one of AMUX 250 or BMUX 255. If SRb/IM5 is an immediate value, the value is delivered to the AMUX 250 or BMUX 255 from the pipeline read stage controller. Multiplexers 242 and 244 select respectively the outputs of AMUX 250 and BMUX 255. The index on one of these outputs is provided to mask generator 330. The scalar register SRa value on the other output is provided to ALU-3 320.

Clock cycle 2 During cycle 2, mask generator 330 generates the 32-bit mask from the index and the DS field as described above. Note that in VEC64 mode, only the five LSBs of the index supplied to the ALU 220 are used by the mask generator to produce a 32-bit mask (the sixth LSB is used to control whether the mask generated by mask generator 330 is to be fed to byte enable port 232 and AMUX 250 and BMUX 255). ALU-3 320 receives from MUX 242 or 244 the scalar value read from register SRa. ALU-3 320 also receives from the pipeline read stage controller the data size DS. ALU-3 320 then generates a vector V2 containing plural copies of the scalar value, as illustrated in FIGS. 8A–8D.

Figure 8A:
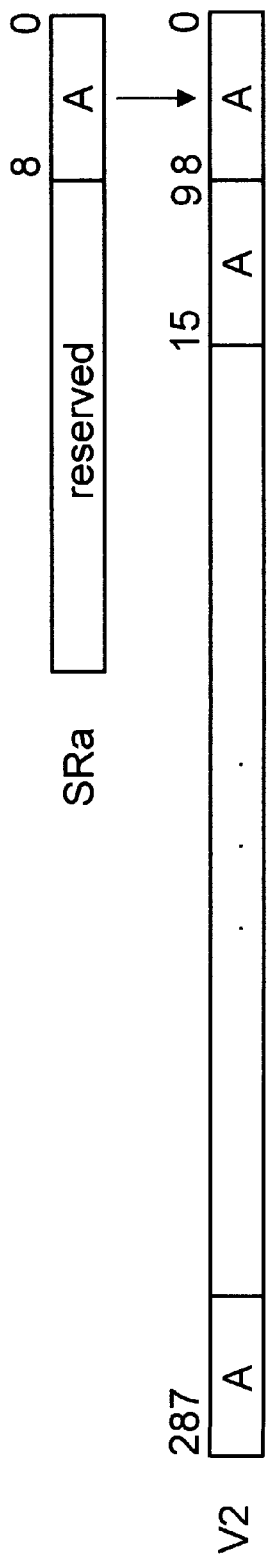

FIG. 8A illustrates the case in which DS specifies a byte9. The byte9 scalar value A in bits [8:0] of register SRa is copied to the consecutive 9-bit fields in bits [8:0], [15:9], . . . , [287:279] of vector V2.

Figure 8B:
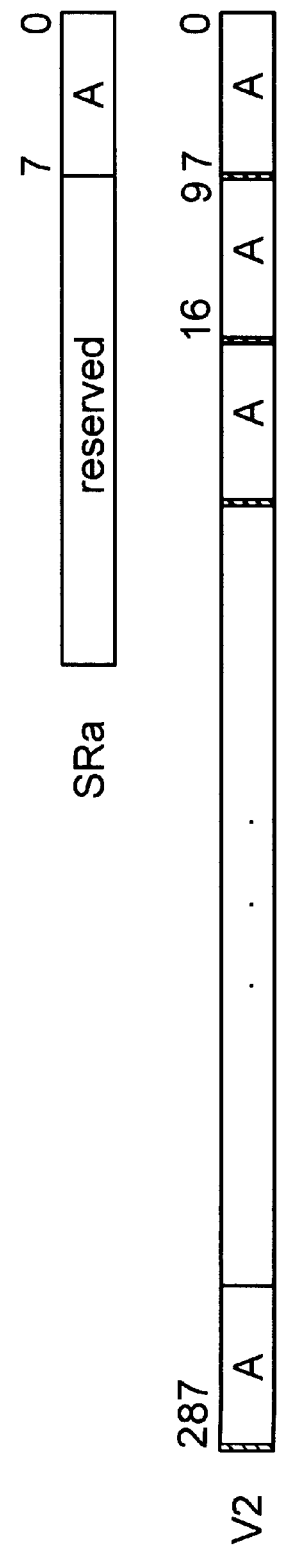

FIG. 8B illustrates the case in which DS specifies a byte. The value A in the 8 LSBs of register SRa is copied into the 8 LSBs of every 9-bit field [8:0], [15:9], . . . [287:279]. The ninth bits are "don't care" in this operation.

Figures 8C, 8D:
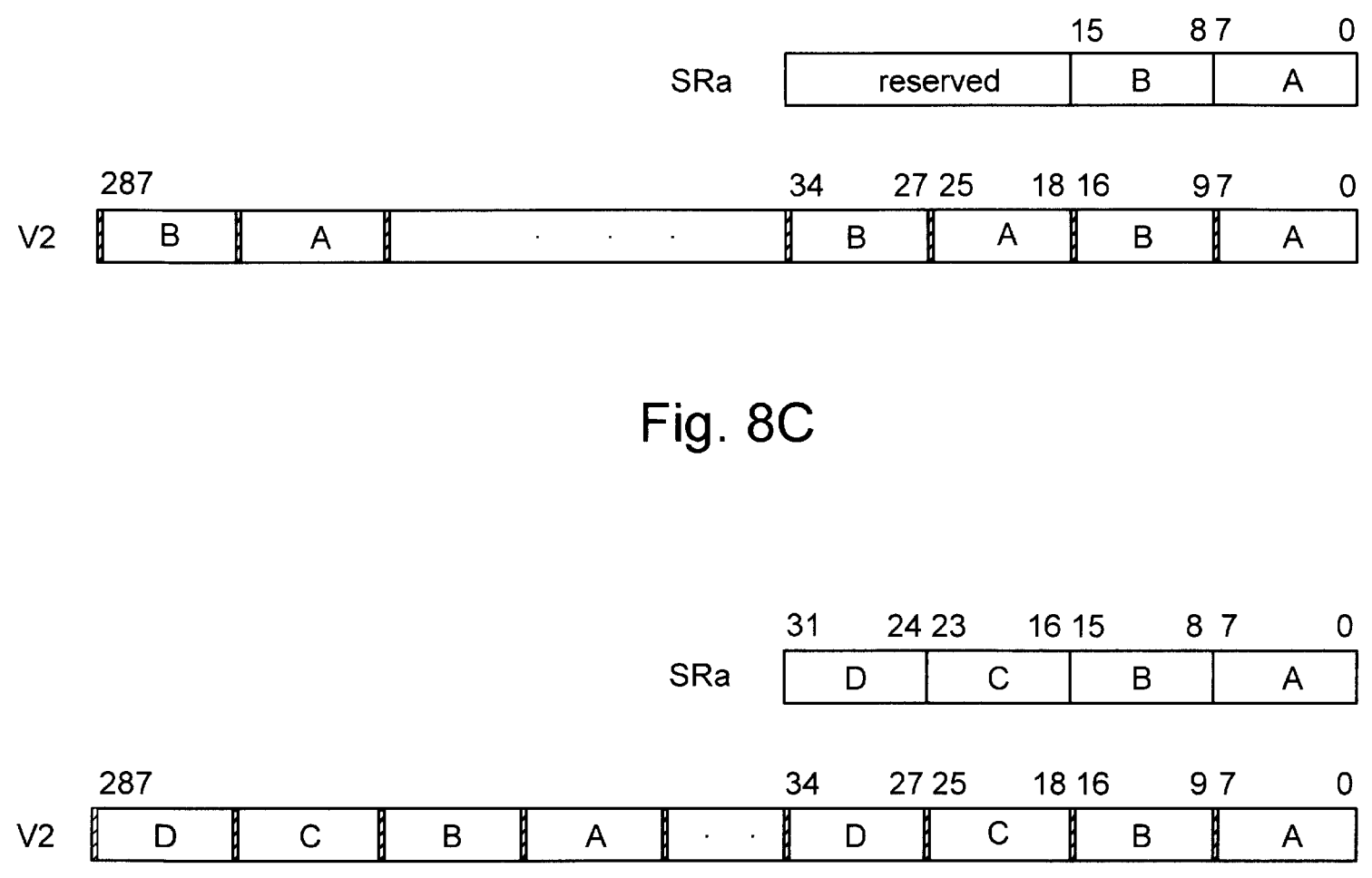

FIG. 8C illustrates the case in which DS specifies a halfword. The halfword in scalar register SRa has a value A in bits [7:0] and a value B in bits [15:8]. These values are replicated through the vector V2 with every ninth bit of V2 being "don't care" bits [7:0] of V2 receive A, bits [16:9] receive B, bits [25:18] receive A, bits [34:27] receive B, and so on to the end of V2.

FIG. 8D illustrates the case in which DS specifies a word. In register SRa, bits [7:0] contain a value A, bits [15:8] contain B, bits [23:16] contain C, and bits [31:24] contain D. The word in register SRa is replicated throughout register V2 with every ninth bit of V2 being "don't care": bits [7:0] of V2 receive A, bits [16:9] receive B, bits [25:18] receive C, bits [34:27] receive D, bits [36:43] receive A, and so on to the end of V2.

Vector V2 is provided on ALU output 220.1 connected to accumulator 230, WBMUX 270 and AccMUX 260. The mask is provided on output 220.2 connected to byte enable port 232 and to respective inputs of AMUX 250 and BMUX 255. In VEC64 mode the sixth LSB of the index is fed to the pipeline read controller (not shown). If the sixth LSB does not match the first instruction flag (i.e. if they are not both zeroes or both ones), the pipeline read controller controls the multiplexer connected to the output 220.2 to select an input connected to a 32-bit buffer whose bits are all reset, i.e. a mask selecting no elements is fed to byte enable port 232, AMUX 250 and BMUX 255.

If the result of VINSRT (the vector in register file 200 with the scalar value written to the vector) is going to be used in the next instruction, then the processor generates a "forwarding enabled" signal. In this case, VRd field 970 is provided to read address control 226 or 228, and the vector register is read to AMUX 250 or BMUX 255 respectively.

Finally, in VEC64 mode the second VINSRT instruction is executed in a pipelined fashion, i.e. cycle-1 of the execution of the second VINSRT instruction is executed contemporaneously to cycle-2 of the execution of the first VINSRT instruction.

Clock cycle 3 During cycle 3, the vector V2 is routed to input port 202 or 204 through WBMUX 270 and W1MUX 240 or AccMUX 260 and W2MUX 245 respectively. VRd field 970 is provided to respective write controls 222 or 224. The mask is provided to byte enable port 232. V2 byte9 fields selected by the mask are written to the VRd register. More particularly, for each mask bit i that is set, the byte9 of V2 (i.e. the bits V2 [9$i$+8:9$i$]) is written to VRd. The rest of the VRd register remains unchanged. Note that in VEC64 mode, if the 6th LSB of the index does not match the first instruction signal the mask is all zeroes and no elements are updated.

The vector V2 on the output of WBMUX 270 or Acc-MUX 260, and the mask on output 220.2, are provided to AMUX 250 and BMUX 255. If forwarding is enabled, AMUX 250 or BMUX 255 which read the VRd register in cycle 2 updates its copy of the VRd register by writing the V2 byte9 fields, selected by the mask, to the VRd copy. The AMUX 250 or BMUX 255 provides the updated copy of the VRd register on the AMUX or BMUX output for use in the next instruction. The AMUX or BMUX output and the VRd register in file 200 thus have identical vectors. As a result, at the end of cycle 3, the new vector is immediately available to ALU 220 and multiplier 210 without the need to read the VRd register from register file 200, thus saving an additional cycle in forward passing operations.

In VEC64 mode, the second VINSRT instruction, continues to be executed in a pipelined fashion, i.e. its cycle-2 is executed during cycle-3 of the first VINSRT instruction.

Clock Cycle 4

In VEC64 mode, cycle-3 of the second VINSRT instruction is executed after the first VINSRT is completed. Thus, the execution of the entire VEC64 VINSRT requires 4 cycles, while each of the pipelined VINSRT instructions generated by the pipelined read controller requires 3 cycles.

Embodiments described above illustrate but do not limit the invention. In particular, the invention is not limited by the number of ports of the register file, by any particular data types, data sizes or instruction formats, any particular timing, or any specific hardware implementation. In some embodiments, the register file includes a separate byte enable port for each write port. In some embodiments, the processor comprises more than one ALU. Additional ALUs can increase contention for register file access even if the register file has additional ports. However, the fact that writing a scalar value to a vector register in the register file does not require reading the vector decreases contention for register file access. Other embodiments and variations are within the scope of the invention, as defined by the following claims.

I claim:

1. A method for writing a scalar value to a predetermined position in a first vector stored in a storage device in a computer system, the method comprising:
    generating a second vector containing plural copies of said scalar value;
    generating a signal representing said predetermined position;
    applying said second vector and said signal to said storage device; and
    in response to said signal, the storage device writing a portion of said second vector to said predetermined position in the first vector while leaving the rest of the first vector unchanged;
    wherein said signal is a function of said data type of said scalar value.

2. A method for writing a scalar value to a predetermined position in a first vector stored in a storage device in a computer system, the method comprising:
    generating a second vector containing plural copies of said scalar value;
    generating a signal representing said predetermined position;
    applying said second vector and said signal to said storage device; and
    in response to said signal, the storage device writing a portion of said second vector to said predetermined position in the first vector while leaving the rest of the first vector unchanged;
    wherein as a result of writing a portion of the second vector to the predetermined position of the first vector, the storage device obtains a third vector in place of the first vector, and the method further comprises:
        before a portion of the second vector is written to the predetermined position in the first vector, reading the first vector from the storage device to a first circuit, the first circuit writing a portion of the second vector to said predetermined position in the copy of the first vector to obtain a copy of the third vector, and providing the copy of the third vector to a vector processing circuit, the vector processing circuit thus receiving a copy of the third vector before the third vector could be read from the storage device.

3. A method for writing a scalar value to a predetermined position in a first vector stored in a storage device in a computer system the method comprising:
    generating a second vector containing plural copies of said scalar value;
    generating a signal representing said predetermined position;
    applying said second vector and said signal to said storage device;
    in response to said signal, the storage device writing a portion of said second vector to said predetermined position in the first vector while leaving the rest of the first vector unchanged; and
    applying said second vector comprises applying all of the second vector to an input of the storage device in a single clock cycle, and the storage device writes the portion of the second vector to the predetermined position of the first vector in the same clock cycle.

4. A structure comprising:
    a storage device for storing one or more vectors;
    a circuit for generating a signal representing a predetermined position in a vector, wherein a scalar value is to be written to said predetermined position in a first vector stored in the storage device; and
    a circuit for generating a second vector containing plural copies of the scalar value;
    wherein when the second vector and said signal are applied to the storage device, the storage device writes a portion of the second vector to said predetermined position in the first vector while leaving the rest of the first vector unchanged; and
    wherein said signal is a function of a data type of said scalar value.

5. A structure comprising:
    a storage device for storing one or more vectors;
    a circuit for generating a signal representing a predetermined position in a vector, wherein a scalar value is to be written to said predetermined position in a first vector stored in the storage device; and
    a circuit for generating a second vector containing plural copies of the scalar value;
    wherein when the second vector and said signal are applied to the storage device, the storage device writes a portion of the second vector to said predetermined position in the first vector while leaving the rest of the first vector unchanged;
    wherein as a result of writing a portion of the second vector to the predetermined position of the first vector, the storage device obtains a third vector in place of the first vector; and the structure further comprises means for reading the first vector from the storage device to a first circuit before a portion of the second vector is written to the predetermined position in the first vector, the first circuit thus obtaining a copy of the first vector;

wherein the first circuit is for writing a portion of the second vector to said predetermined position in the copy of the first vector to obtain a copy of the third vector, and for providing the copy of the third vector to a vector processing circuit, the vector processing circuit thus receiving a copy of the third vector before the third vector could be read from the storage device.

6. A structure comprising:

a storage device for storing one or more vectors;

a circuit for generating a signal representing a predetermined position in a vector, wherein a scalar value is to be written to said predetermined position in a first vector stored in the storage device; and a circuit for generating a second vector containing plural copies of the scalar value;

wherein when the second vector and said signal are applied to the storage device, the storage device writes a portion of the second vector to said predetermined position in the first vector while leaving the rest of the first vector unchanged; and wherein the application of the second vector to the storage device and writing a portion of the second vector to said predetermined position in the first vector occur in a single clock cycle.

* * * * *